(12) United States Patent
Kitagawa et al.

(10) Patent No.: US 11,522,173 B2
(45) Date of Patent: Dec. 6, 2022

(54) BATTERY CASING, METAL-AIR BATTERY, AND METHOD FOR PRODUCING METAL-AIR BATTERY

(71) Applicant: SHARP KABUSHIKI KAISHA, Sakai (JP)

(72) Inventors: Tomo Kitagawa, Sakai (JP); Shinobu Takenaka, Sakai (JP); Hirotaka Mizuhata, Sakai (JP); Masaki Kaga, Sakai (JP); Toyoka Aimoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 344 days.

(21) Appl. No.: 16/652,962

(22) PCT Filed: Sep. 26, 2018

(86) PCT No.: PCT/JP2018/035707
§ 371 (c)(1),
(2) Date: Apr. 1, 2020

(87) PCT Pub. No.: WO2019/069764
PCT Pub. Date: Apr. 11, 2019

(65) Prior Publication Data
US 2020/0266423 A1 Aug. 20, 2020

(30) Foreign Application Priority Data

Oct. 2, 2017 (JP) .............................. JP2017-192569
Oct. 2, 2017 (JP) .............................. JP2017-192571

(51) Int. Cl.
*H01M 8/04* (2016.01)
*H01M 4/134* (2010.01)
(Continued)

(52) U.S. Cl.
CPC ......... *H01M 4/134* (2013.01); *H01M 50/155* (2021.01); *H01M 50/46* (2021.01);
(Continued)

(58) Field of Classification Search
CPC ..... H01M 4/134; H01M 50/46; H01M 50/155
See application file for complete search history.

(56) References Cited

U.S. PATENT DOCUMENTS 5,441,820 A * 8/1995 Siu .................. H01M 8/225
429/81
2015/0364789 A1 12/2015 Ogawa et al.

FOREIGN PATENT DOCUMENTS

| JP | S47-018017 U1 | 10/1972 |
| JP | 2015-005493 A | 1/2015 |
| JP | 2017-162773 A | 9/2017 |

* cited by examiner

*Primary Examiner* — Olatunji A Godo
(74) *Attorney, Agent, or Firm* — ScienBiziP, P.C.

(57) ABSTRACT

In a battery casing a metal negative electrode that contains metal serving as a negative electrode active material and an air electrode are arranged so as to face each other in a state where at least a part of the metal negative electrode and the air electrode is immersed in an electrolytic solution inside a casing. The metal negative electrode is housed in a negative electrode housing in the casing. A separator separating the metal negative electrode and the air electrode is arranged at a side surface of the negative electrode housing. An opening through which inside of the negative electrode housing and outside of the negative electrode housing communicate with each other is provided on an upper surface of the negative electrode housing.

17 Claims, 14 Drawing Sheets

(51) Int. Cl.
    *H01M 50/46*     (2021.01)
    *H01M 50/155*     (2021.01)
    *H01M 4/02*     (2006.01)

(52) U.S. Cl.
    CPC ................. *H01M 2004/021* (2013.01); *H01M 2004/027* (2013.01); *H01M 2004/028* (2013.01)

(a)

(b)

BATTERY CASING, METAL-AIR BATTERY, AND METHOD FOR PRODUCING METAL-AIR BATTERY

TECHNICAL FIELD

The present disclosure relates to a battery casing used for a metal-air battery, a metal-air battery, and a method for producing a metal-air battery.

BACKGROUND ART

A metal-air battery is formed by including an air electrode (positive electrode), a metal negative electrode (negative electrode), and an electrolyte layer (electrolytic solution). For a metal-air secondary battery, a configuration in which a metal negative electrode is covered by a coating material and a separator to prevent a short circuit caused by a dendrite during discharge or during charge is proposed (PTL 1).

FIG. 15 is a sectional view illustrating a schematic configuration of a conventional metal-air secondary battery indicated in PTL 1 or the like. FIG. 16 is an oblique view illustrating a state where a metal negative electrode used in the metal-air secondary battery of FIG. 15 is covered by a coating material and a separator.

In the metal-air secondary battery illustrated in FIG. 15, an air electrode 110 and a metal negative electrode 120 are arranged in a casing 100 and the air electrode 110 and the metal negative electrode 120 are arranged parallel to each other in a state of being immersed in an electrolytic solution 130.

The metal negative electrode 120 has a configuration in which a negative electrode current collector 121 is held in an active material layer 122. A separator (for example, an anion membrane) 140 is arranged on each side of the metal negative electrode 120, and both the metal negative electrode 120 and the separator 140 are housed in a negative electrode casing (coating material) 150. An opening 151 is provided on each side surface of the negative electrode casing 150, and the electrolytic solution 130 permeates the separator 140 to be injected into the negative electrode casing 150.

The air electrode 110 is arranged on each side surface in the casing 100, and an air intake 111 is provided in a side plate of the casing 100 so that a part of a surface of the air electrode 110 is exposed to air. Further, a liquid inlet 112 through which the electrolytic solution 130 is injected into the casing 100 is provided on an upper surface of the casing 100.

CITATION LIST

Patent Literature

PTL 1: Japanese Unexamined Patent Application Publication No. 2015-5493

SUMMARY OF INVENTION

Technical Problem

The conventional metal-air secondary battery illustrated in FIG. 15 has a problem in that, for the electrolytic solution 130 to be injected into the negative electrode casing 150, it takes time for the electrolytic solution 130 to be injected through the liquid inlet 112 and to subsequently permeate the separator 140. That is, injecting the electrolytic solution during production of the metal-air battery is time consuming.

Note that, also for a metal-air primary battery, a separator is needed for an air electrode and a metal negative electrode not to be in contact (short-circuited), and a coating material is needed to prevent excessive discharge at an end of the negative electrode. Accordingly, a similar problem is caused not only in the metal-air secondary battery but also in the metal-air primary battery.

The disclosure is made in view of the aforementioned problem and aims to provide a metal-air battery capable of reducing the time taken to inject an electrolytic solution into a metal negative electrode housed in a negative electrode housing.

Solution to Problem

To solve the aforementioned problem, a battery casing of the disclosure includes: inside the battery casing, a metal negative electrode that contains metal serving as a negative electrode active material; and an air electrode arranged so as to face the metal negative electrode, in which the metal negative electrode is housed in a negative electrode housing in the battery casing, a separator separating the metal negative electrode and the air electrode is arranged at a side surface of the negative electrode housing, and an opening through which inside of the negative electrode housing and outside of the negative electrode housing communicate with each other is provided on an upper surface of the negative electrode housing.

Advantageous Effects of Invention

In a battery casing and a metal-air battery of the disclosure, in a process of injecting an electrolytic solution into the casing, the electrolytic solution is directly injected also into a negative electrode housing through a liquid inlet provided in the negative electrode housing. Thus, exerted is an effect that a time to inject the electrolytic solution is able to be significantly shortened, as compared to a conventional metal-air battery in which an electrolytic solution is injected into a negative electrode housing by only liquid permeation from a separator.

DESCRIPTION OF EMBODIMENTS

Embodiment 1

An embodiment of the disclosure will be described below in detail with reference to the drawings.

Figure 1:
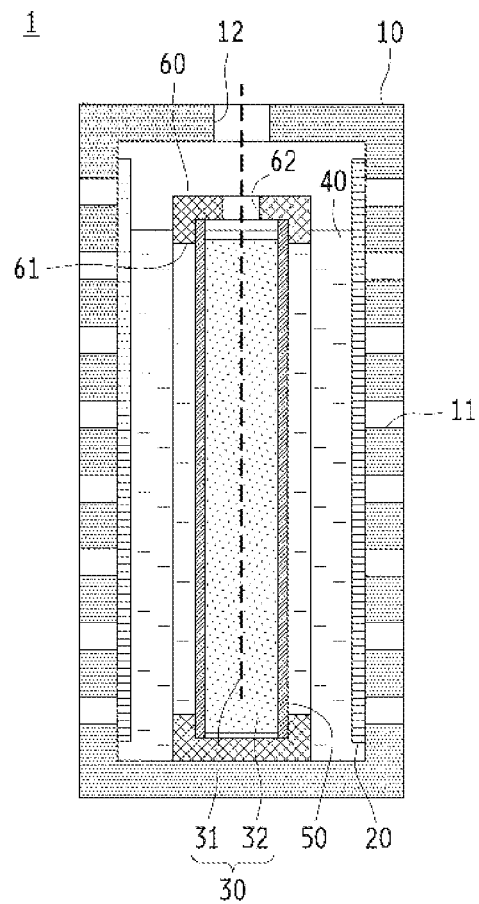
FIG. 1 is a sectional view illustrating a schematic configuration of a metal-air battery according to Embodiment 1.
Figure 2:
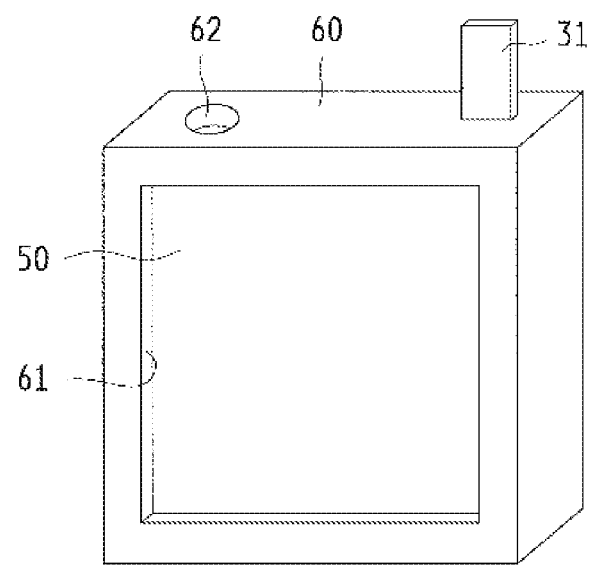
FIG. 2 is an oblique view illustrating a state where a metal negative electrode used in the metal-air battery of FIG. 1 is covered by a coating material and a separator.

FIG. 1 is a sectional view illustrating a schematic configuration of a metal-air battery 1 according to Embodiment 1. FIG. 2 is an oblique view illustrating a state where a metal negative electrode used in the metal-air battery 1 of FIG. 1 is covered by a coating material and a separator.

In the metal-air battery 1 illustrated in FIG. 1, an air electrode 20 and a metal negative electrode 30 are arranged in parallel in a casing 10 in a state of being immersed in an electrolytic solution 40.

The metal negative electrode 30 is an electrode formed of an active material containing a metallic element, and an oxidation reaction of the active material occurs during discharge and a reduction reaction thereof occurs during charge. As the metallic element, zinc, lithium, sodium, calcium, magnesium, aluminum, iron, or the like is used. In the metal negative electrode 30 illustrated in FIG. 1, a negative electrode current collector 31 is held in an active material layer 32 to be integrated.

Moreover, a separator (for example, an anion conducting membrane) 50 is arranged on each side of the metal negative electrode 30. The separator 50 prevents electrodes from being short-circuited by an electrical conduction path formed between the electrodes and is formed of an electrical insulating material. That is, the separator 50 suppresses a short circuit caused when, for example, a metal dendrite reductively deposited on the metal negative electrode 30 during charge extends to the air electrode 20. As the separator 50, a general material in this field is usable, and a porous resin sheet or a solid electrolyte sheet such as an anion conducting membrane or an ion-exchange membrane is used. Ion conduction of hydroxide ions or the like occurs via the separator 50 arranged between the electrodes. When an anion conducting membrane is used for the separator 50, it is also possible to ensure that hydroxide ions permeate the separator 50 while anions each having a large ion radius, such as $[Zn[(OH)_4]^{2-}$, do not permeate the separator 50.

The air electrode 20 is arranged on each side surface in the casing 10, and an air intake 11 is provided in a side plate of the casing 10 so that a part of a surface of the air electrode 20 is exposed to air. Further, a liquid inlet 12 through which the electrolytic solution 40 is injected into the casing 10 is provided on an upper surface of the casing 10. Though detailed illustration is omitted in FIG. 1, the air electrode 20 is composed of a current collector, a catalyst layer, a water-repellent layer, and the like. The catalyst layer may contain, for example, a conductive porous support and an oxygen reduction catalyst on the porous support. This makes it possible to form a three-phase interface where oxygen gas, water, and electrons are present together on the oxygen reduction catalyst, thus enabling a discharge reaction to proceed. Moreover, the catalyst layer may further contain an oxygen evolution catalyst. This makes it possible to form a three-phase interface where oxygen gas, water, and electrons are present together on the oxygen evolution catalyst, thus enabling a charge reaction to proceed. Moreover, the catalyst layer may be a catalyst having both oxygen reduction activity and oxygen evolution activity. In addition, the water-repellent layer is provided to prevent leakage of the electrolytic solution from the air intake 11 via the air electrode 20 and has a gas-liquid separation function.

Moreover, in the metal-air battery 1, both the metal negative electrode 30 and the separator 50 are housed in a negative electrode housing (coating material) 60. An opening 61 is provided on each side surface of the negative electrode housing 60 so that the electrolytic solution 40 permeates the separator 50 through the opening 61 to be injected into the negative electrode housing 60. Further, a liquid inlet 62 is provided on an upper surface of the negative electrode housing 60. Here, the negative electrode current collector 31 forming the metal negative electrode 30 protrudes to the outside of the negative electrode housing 60 from an upper end of the negative electrode housing 60. A configuration in which a surface of a region where the negative electrode current collector 31 protrudes to the outside of the negative electrode housing 60 is covered by an insulating coating (not illustrated) so that the negative electrode current collector 31 and the electrolytic solution 40 do not have direct contact may be adopted.

The electrolytic solution 40 is a liquid in which an electrolyte is dissolved in a solvent and which has ionic conductivity. The type of the electrolytic solution 40 varies depending on the type of electrode active material contained in a metal electrode and may be an electrolytic solution (aqueous electrolytic solution) using a water solvent. For example, for a zinc-air battery, an aluminum-air battery, or an iron-air battery, an alkaline aqueous solution such as an aqueous solution of sodium hydroxide or an aqueous solution of potassium hydroxide is able to be used as the electrolytic solution 40. For a magnesium-air battery, an aqueous solution of sodium chloride is able to be used as the electrolytic solution 40. For a lithium-air battery, an organic electrolytic solution 40 is able to be used. An organic additive or an inorganic additive in addition to an electrolyte may be added to the electrolytic solution 40, or the electrolytic solution 40 may be gelatinized with a polymer additive.

In the metal-air battery 1 according to Embodiment 1, after components thereof (such as the casing and the electrodes) are assembled, the electrolytic solution 40 is injected through the liquid inlet 12, and after the liquid injection, the liquid inlet 12 is closed by a cap (not illustrated) or the like. In addition, in the liquid injection process, the electrolytic solution 40 is directly injected into the negative electrode housing 60 through the liquid inlet 62. Thus, compared with a conventional metal-air battery in which an electrolytic solution is injected into a negative electrode housing by only liquid permeation from a separator, the time to inject the electrolytic solution 40 is able to be significantly shortened. Note that, in Embodiment 1 and in Embodiments 2 to 4 described below, a structure, in which the components are assembled, before the electrolytic solution 40 is injected corresponds to a battery casing described in the scope of the claims.

Figure 3:
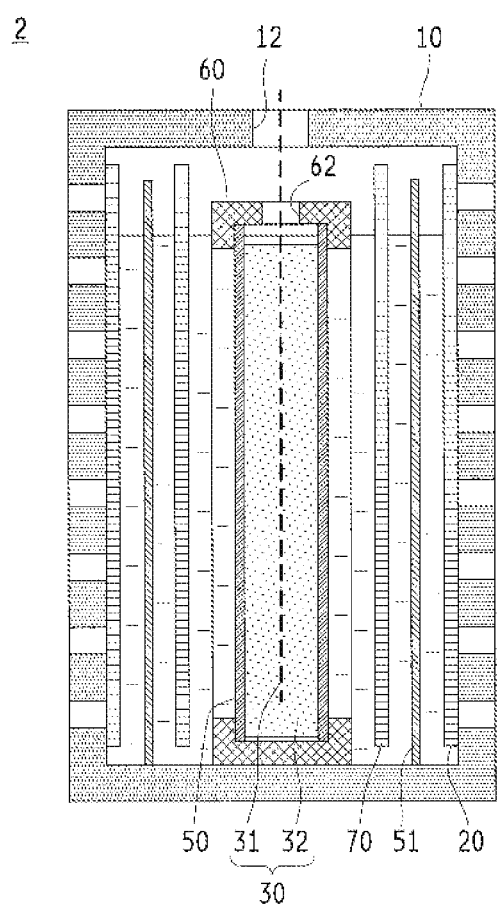
FIG. 3 is a sectional view illustrating a schematic configuration of a three-electrode metal-air secondary battery as a modified example of the metal-air battery according to Embodiment 1.

Note that, as the metal-air battery 1 illustrated in FIG. 1, a two-electrode metal-air secondary battery using the air electrode 20 as a positive electrode not only during discharge but also during charge is taken as an example, but the disclosure is not limited thereto and is also applicable to a metal-air primary battery or a three-electrode metal-air secondary battery. In the metal-air primary battery, for example, a catalyst layer of an air electrode may contain an oxygen reduction catalyst and not contain an oxygen evolution catalyst. FIG. 3 is a sectional view illustrating a schematic configuration of a three-electrode metal-air secondary battery 2.

In the metal-air secondary battery 2 illustrated in FIG. 3, a charging electrode 70 is arranged between the negative electrode housing 60 and the air electrode 20, and further, a separator 51 is arranged between the air electrode 20 and the charging electrode 70. In the three-electrode metal-air secondary battery 2, the air electrode 20 is used as the positive electrode during discharge and the charging electrode 70 is used as the positive electrode during charge. In the air electrode of the three-electrode metal-air secondary battery, the catalyst layer may contain a catalyst having oxygen reduction activity. Moreover, for the charging electrode 70, an electrode having oxygen evolution activity is able to be used and a Ni electrode or a stainless electrode is used, for example. Using Ni or stainless mesh, expanded metal, punched metal, a sintered product of metal particles or metal fibers, foam metal, or the like enables the charging electrode 70 to be porous. Moreover, the charging electrode 70 may further include, on a surface thereof, catalyst particles promoting a charge reaction.

Embodiment 2

In Embodiment 2, a configuration of a metal-air battery capable of further preventing a short circuit caused by a dendrite will be described.

Figure 4:
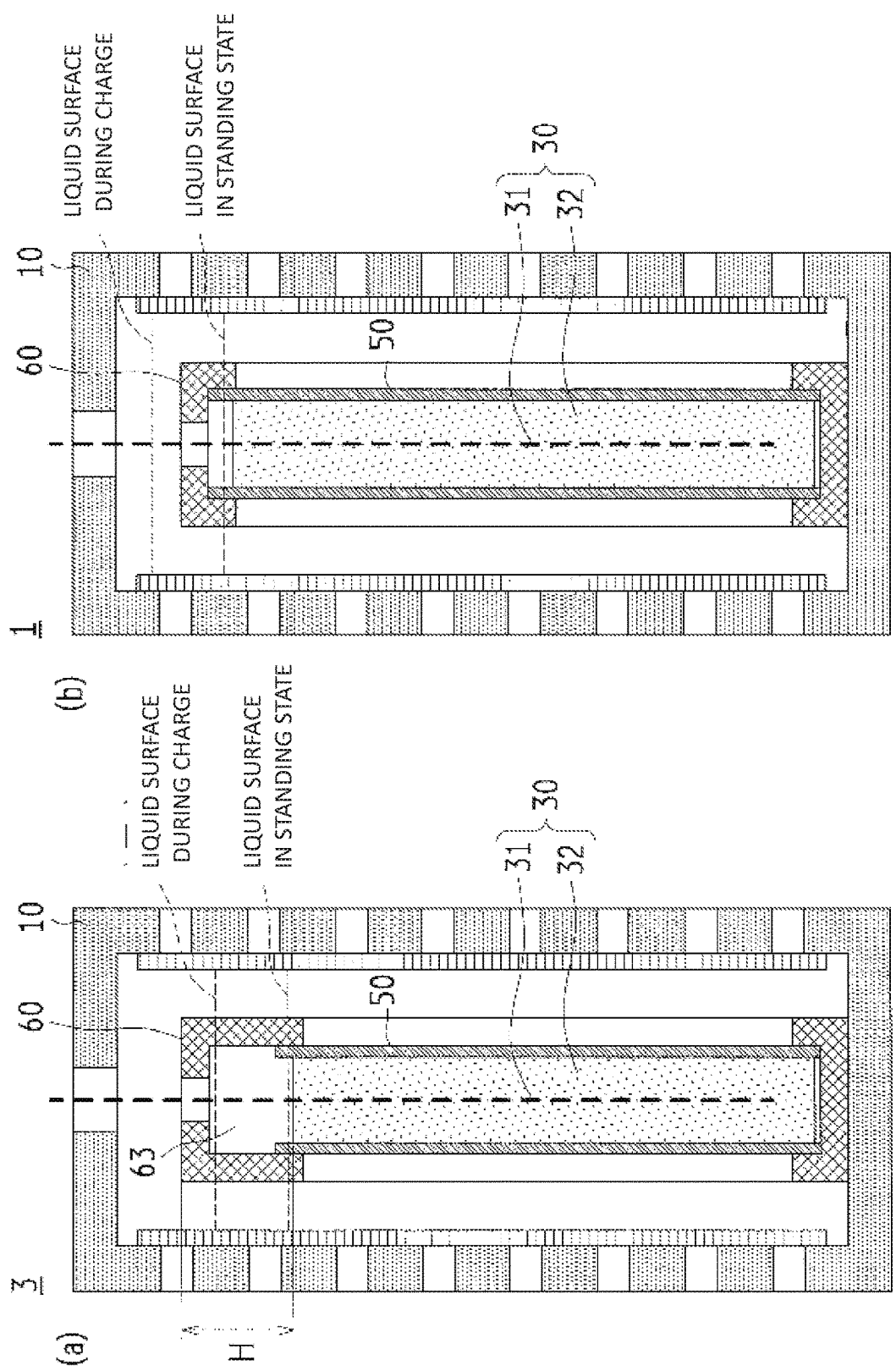
FIG. 4(a) is a sectional view illustrating a schematic configuration of a metal-air battery according to Embodiment 2 and FIG. 4(b) is a sectional view illustrating a schematic configuration of a metal-air battery illustrated for comparison.

FIG. 4(a) is a sectional view illustrating a schematic configuration of a metal-air battery 3 according to Embodiment 2. In the metal-air battery 3 in FIG. 4(a), inside the negative electrode housing 60, a space 63 is formed above the metal negative electrode 30 and the separator 50. Moreover, the metal-air battery 1 in which no space 63 is formed is illustrated in FIG. 4(b) for comparison.

During charge of the metal-air battery, oxygen is generated near the charging electrode (or the air electrode) and the generated oxygen becomes air bubbles in the electrolytic solution. Due to the air bubbles, a liquid surface of the electrolytic solution existing outside the negative electrode housing 60 during charge rises higher than a liquid surface in a standing state.

In a comparative example (metal-air battery 1) illustrated in FIG. 4(b), the liquid surface of the electrolytic solution 40, which rises during charge, may exceeds the upper surface of the negative electrode housing 60. Then, when charge continues in a state where the liquid surface of the electrolytic solution 40 exceeds the upper surface of the negative electrode housing 60, a dendrite grows above the negative electrode housing 60 so that a short circuit may be caused between the negative electrode current collector 31 and the air electrode 20.

On the other hand, in the metal-air battery 3 according to Embodiment 2, inside the negative electrode housing 60, the space 63 is provided between an upper end of the metal negative electrode 30 and the upper surface of the negative electrode housing 60, thus making it possible to prevent the liquid surface of the electrolytic solution 40, which rises during charge, from exceeding the upper surface of the negative electrode housing 60. As a result, it is possible to prevent a short circuit between the negative electrode current collector 31 and the air electrode 20 due to growth of the dendrite above the negative electrode housing 60.

In the metal-air battery 3, a height H, a lower region volume V1, and an upper region volume V2 satisfy $$0.08 < (H/(V1/V2)) < 2.0,$$

preferably satisfy $$0.3 < (H/(V1/V2)) < 1.5,$$

where H (mm) is the height of the space 63, V1 ($cm^3$) is the lower region volume of a part that is inside the negative electrode housing 60 and lower than the liquid surface of the electrolytic solution 40 when the metal-air battery 3 stands, and V2 ($cm^3$) is the upper region volume of a part that is inside the negative electrode housing 60 and higher than the liquid surface of the electrolytic solution 40 when the metal-air battery 3 stands.

When H/(V1/V2) is lower than 0.08, the liquid surface of the electrolytic solution 40 may exceed the upper surface of the negative electrode housing 60 and a short circuit may be caused between the negative electrode current collector 31 and the air electrode 20. When H/(V1/V2) exceeds 2.0, a volume of the negative electrode housing 60 in the metal-air battery 3 increases and energy density of the battery is reduced.

Embodiment 3

In Embodiment 3, another configuration of a metal-air battery capable of further preventing a short circuit caused by a dendrite will be described.

Figure 5:
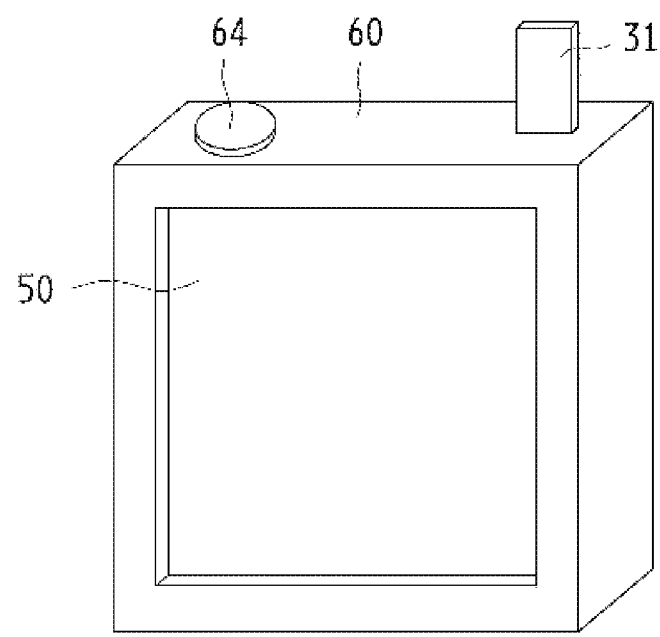
FIG. 5 is an oblique view illustrating a state where a metal negative electrode used in a metal-air battery according to Embodiment 3 is covered by a coating material and a separator.

FIG. 5 is an oblique view illustrating a state where a metal negative electrode used in the metal-air battery according to Embodiment 3 is covered by the negative electrode housing 60 and the separator 50. As illustrated in FIG. 5, Embodiment 3 is characterized in a structure in which a liquid inlet cover 64 covers the liquid inlet 62 in the negative electrode housing 60. Needless to say, the liquid inlet cover 64 covers the liquid inlet 62 after liquid injection of the electrolytic solution in the metal-air battery is completed. Note that, the metal-air battery according to Embodiment 3 basically has a similar structure to that of the metal-air battery 1 in Embodiment 1 except that the liquid inlet cover 64 covers the liquid inlet 62.

Figure 6:
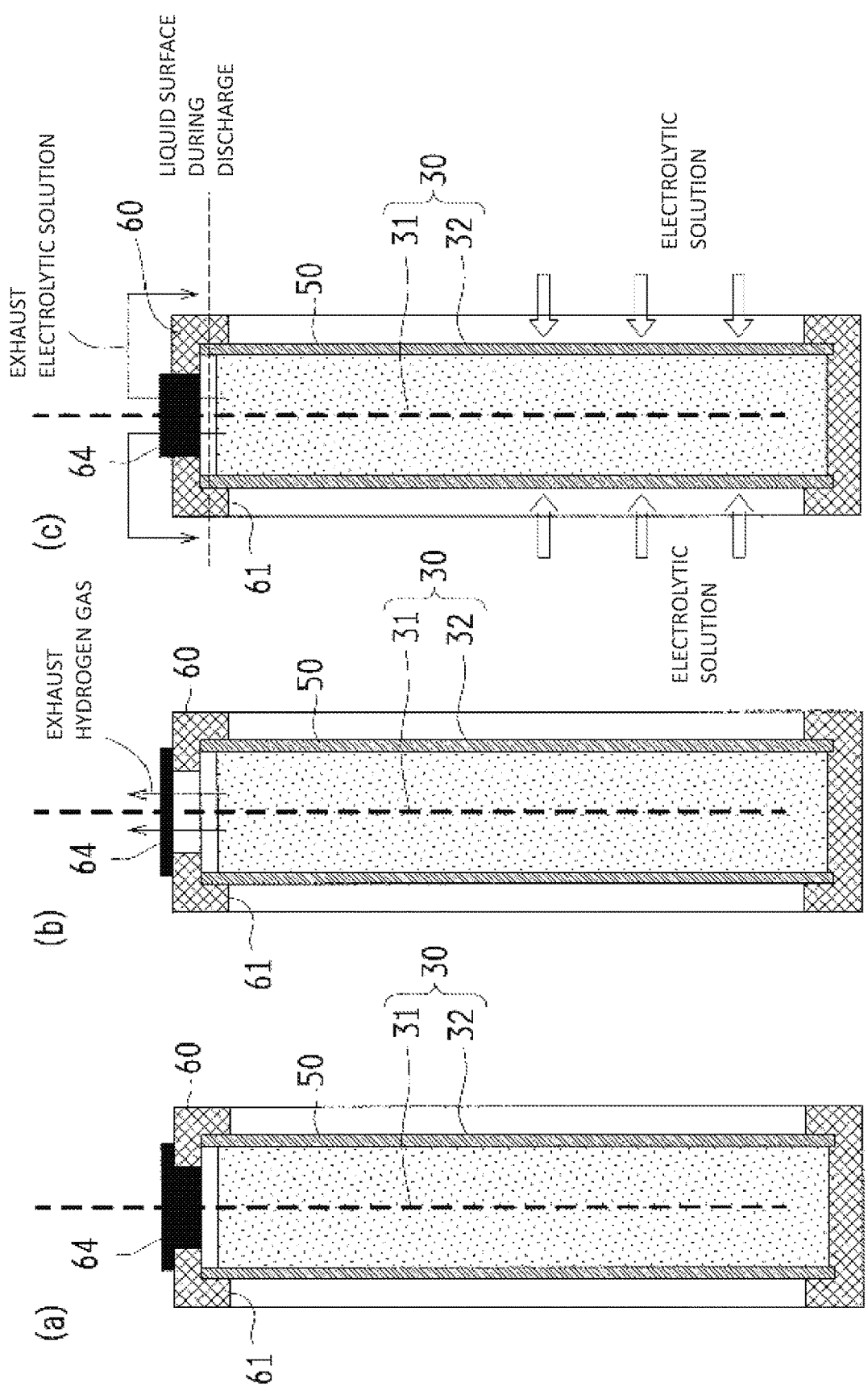
FIGS. 6(a) to 6(c) each illustrate a specific example of a liquid inlet cover in Embodiment 3 and are sectional views each illustrating a negative electrode housing, and the metal negative electrode and the separator that are inside the negative electrode housing.

FIGS. 6(*a*) to 6(*c*) each illustrate a specific example of the liquid inlet cover 64 and are sectional views each illustrating the negative electrode housing 60, and the metal negative electrode 30 and the separator 50 that are inside the negative electrode housing 60.

FIG. 6(*a*) illustrates a configuration when the liquid inlet cover 64 is a sealing cover (for example, such as a resin cover or a sealing material). When there is no liquid inlet cover 64, the liquid surface of the electrolytic solution 40 existing outside the negative electrode housing 60 during charge rises higher than the liquid surface in the standing state, the liquid surface exceeds the upper surface of the negative electrode housing 60, the electrolytic solution 40 flows from the liquid inlet 62 into the negative electrode housing 60, and, through a path thereof, the air electrode 20 and the metal negative electrode 30 inside the negative electrode housing 60 are connected by the electrolytic solution so that liquid junction is caused. Due to the liquid junction, a short circuit may be caused between the metal negative electrode 30 and the air electrode 20 by a dendrite caused from the metal negative electrode 30 inside the negative electrode housing 60. On the other hand, according to a configuration in which the liquid inlet cover 64 is provided, when the sealing cover is put on the liquid inlet 62, liquid junction caused by the electrolytic solution 40 flowing into the liquid inlet 62 as the liquid surface of the electrolytic solution 40 rises during charge is able to be prevented, so that a short circuit is able to be suppressed.

FIG. 6(*b*) illustrates a configuration when the liquid inlet cover 64 is a gas-liquid separation film (for example, such as a water-repellent porous film). According to the configuration, since the gas-liquid separation film prevents a flow of liquid, liquid junction caused by the electrolytic solution 40 flowing into the liquid inlet 62 as the liquid surface of the electrolytic solution 40 rises during charge is able to be prevented, so that a short circuit is able to be suppressed, similarly to the configuration of FIG. 6(*a*). Further, since the gas-liquid separation film allows a flow of gas, when hydrogen gas is generated by a self-corrosion reaction of the metal negative electrode 30 in the negative electrode housing 60, the hydrogen gas is able to be exhausted through the liquid inlet 62 to the outside of the negative electrode housing 60. This makes it possible to suppress expansion inside the negative electrode housing 60.

FIG. 6(*c*) illustrates a configuration when the liquid inlet cover 64 has a valve structure (such as a check valve) by which liquid or gas flows only from the inside to the outside of the negative electrode housing 60. The configuration enables to suppress a short circuit similarly to the configuration of FIG. 6(*a*) and to suppress expansion inside the negative electrode housing 60 similarly to the configuration of FIG. 6(*b*), and further enables to keep a balance of the liquid surface during discharge. During discharge, concentration of metal ions (for example, concentration of zinc ions) inside the negative electrode housing 60 increases, so that an amount of the electrolytic solution inside the negative electrode housing 60 increases due to an osmotic pressure of the separator 50 that is on an active surface of the negative electrode, resulting that the liquid surface of the electrolytic solution 40 existing outside the negative electrode housing 60 is lowered and an acting area of the air electrode is reduced, so that a discharge characteristic may be lowered. When the liquid inlet cover 64 has a valve structure such as a check valve, the electrolytic solution 40 is able to be exhausted to the outside of the negative electrode housing 60 from the inside of the negative electrode housing 60 via the liquid inlet 62, thus making it possible to perform leveling of the liquid surface inside and outside the negative electrode housing 60 and suppress lowering of the discharge characteristic.

Embodiment 4

Figure 7:
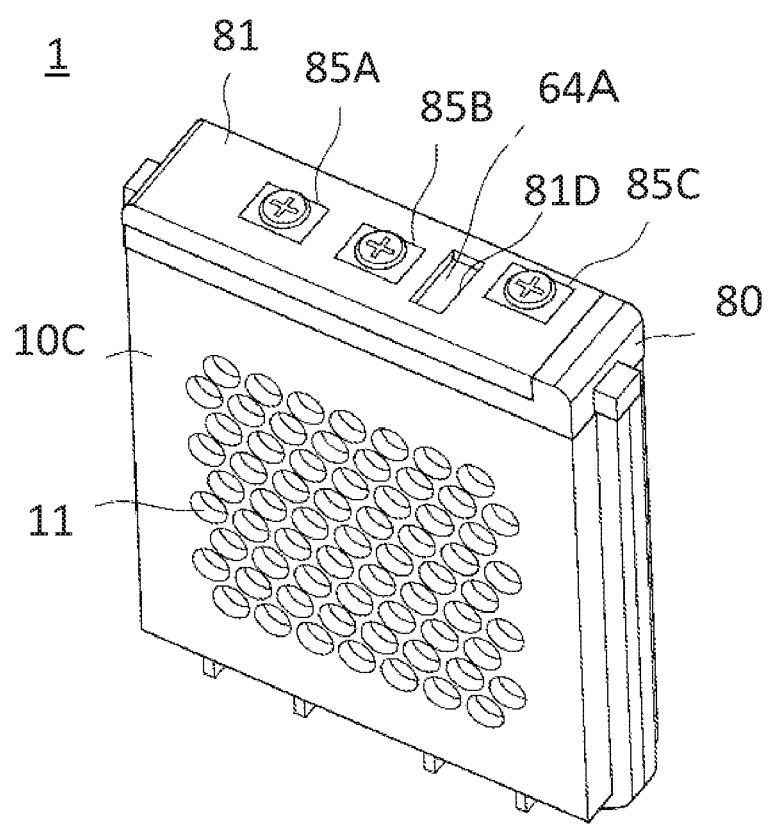
FIG. 7 is an oblique view illustrating an appearance of a metal-air battery according to Embodiment 4.

FIG. 7 is an oblique view illustrating an appearance of a metal-air battery 1 according to Embodiment 4 of the disclosure. Moreover, FIG. 8 is an exploded oblique view illustrating components of the metal-air battery 1 in an exploded manner.

Figure 8:
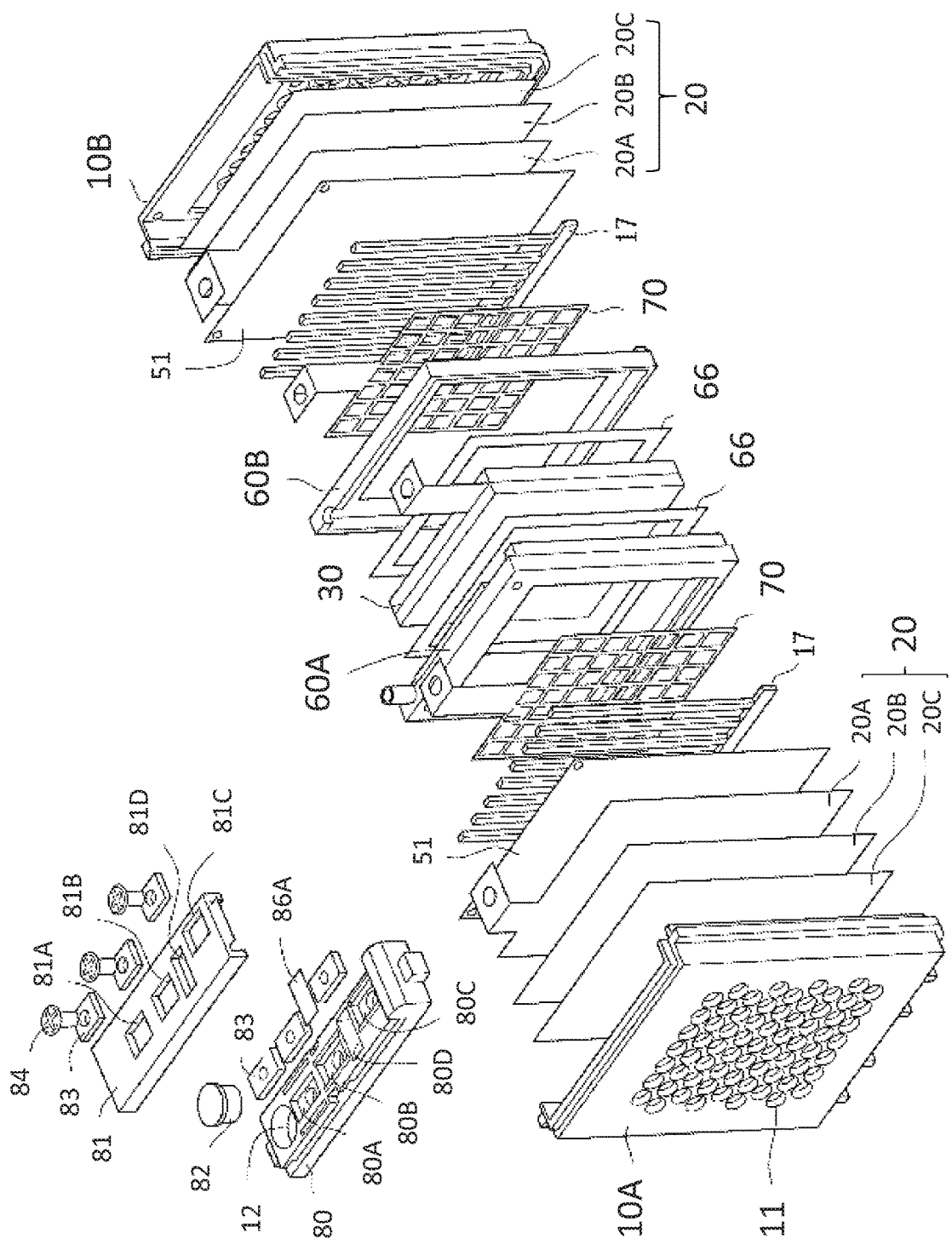
FIG. 8 is an exploded oblique view illustrating components of the metal-air battery of FIG. 7 in an exploded manner.

As illustrated in FIGS. 7 and 8, in the metal-air battery 1, the metal negative electrode 30 that contains metal serving as a negative electrode active material, the charging electrode 70 used as the positive electrode during charge, the air electrode 20 used as the positive electrode during discharge, and the separator 51 interposed between the charging electrode 70 and the air electrode 20 are housed in a battery container 80. They are arranged in parallel to each other in a state where at least a part of them is immersed in an electrolytic solution (not illustrated) in the battery container 80.

As illustrated in FIG. 8, the metal negative electrode 30 is described as one in which the negative electrode current collector 31 is held in an active material layer to be integrated. In addition, the metal negative electrode 30 is configured to be held between two negative electrode housing plates 60A and 60B and housed in an internal space of the negative electrode housing 60 that is formed with the negative electrode housing plates 60A and 60B joined. A packing 66 is arranged between the metal negative electrode 30 and each of the negative electrode housing plates 60A and 60B. Further, a separator (not illustrated) by which the charging electrode 70 and the metal negative electrode 30 are separated may be provided in the negative electrode housing 60.

The charging electrode 70 is arranged on an outer side surface of each of the negative electrode housing plates 60A and 60B. Moreover, in the negative electrode housing 60, the liquid inlet 62 that has a cylindrical shape is provided so as to protrude upwardly from the upper surface of the negative electrode housing 60, and the inside and the outside of the negative electrode housing 60 are electrically connected. A function of the liquid inlet 62 will be described later. Moreover, each side surface of the metal negative electrode 30, which faces the charging electrode 70 or the air electrode 20, is preferably covered by the separator 50 into which the electrolytic solution is able to be immersed.

A gas guide crosspiece 17 may be arranged between the charging electrode 70 and the separator 51. The gas guide crosspiece 17 is used to form a passage through which oxygen (air bubbles) generated on a surface of the charging electrode 70 during charge is released to an upper side of the electrolytic solution.

As illustrated in FIG. 8, the air electrode 20 is described in a state of being exploded into a positive electrode current collector 20A, a catalyst layer 20B that contains catalyst particles having oxygen reduction activity, and a water-repellent layer 20C, but the positive electrode current collector 20A, the catalyst layer 20B, and the water-repellent layer 20C may be, for example, pressed to be integrated together with external casing plate 80A or 80B before assembling of the metal-air battery 1. The external casing plates 80A and 80B are formed by, for example, resin and the external casing plates 80A and 80B are joined to form the battery container 80.

Moreover, the air electrode 20 is provided so as to allow oxygen gas contained in the air to be diffused. For example, the air electrode 20 is able to be provided so that at least a part of the surface of the air electrode 20 is exposed to air. In the metal-air battery 1 illustrated in FIGS. 7 and 8, the air intake 11 is provided in each of the external casing plates 80A and 80B of the battery container 80 and oxygen gas contained in the air is able to be diffused into the air electrode 20 via the air intake 11.

Though the air electrode 20 is constituted by the positive electrode current collector 20A, the catalyst layer 20B, and the water-repellent layer 20C as described above, the catalyst layer 20B may contain, for example, a conductive porous support and an air electrode catalyst on the porous support. This makes it possible to form a three-phase interface where oxygen gas, water, and electrons are present together on the air electrode catalyst, thus making it possible for a discharge reaction to proceed. Moreover, the water-repellent layer 20C is provided to prevent leakage of the electrolytic solution from the air intake 11 via the air electrode 20 and has a gas-liquid separation function.

Figure 9:
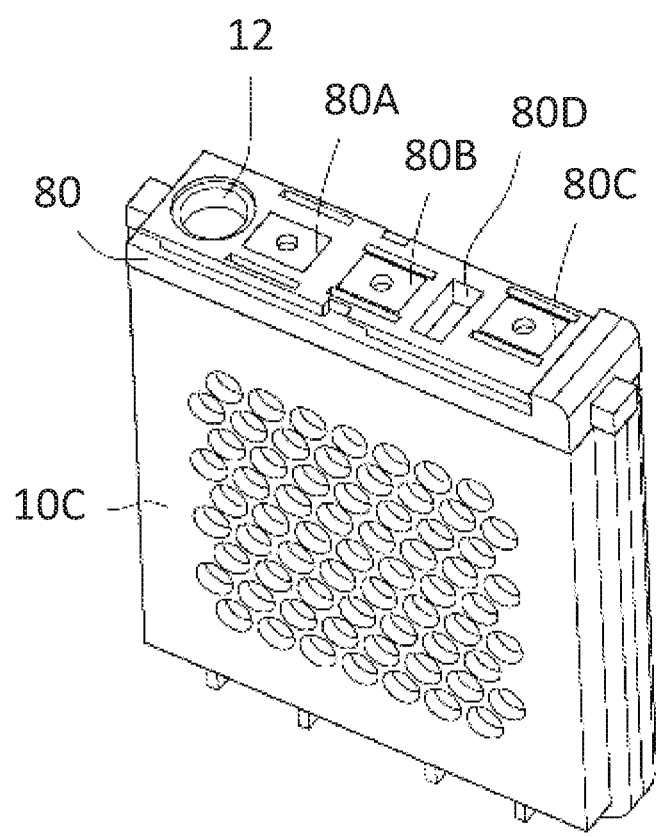
FIG. 9 is an oblique view illustrating a state where only an inside cover is attached to a casing in the metal-air battery of FIG. 7.

An upper edge part of the battery container 80 is opened, and an inside cover 81 and an outside cover 82 that close the upper edge part of the battery container 80 are provided in the metal-air battery 1 so as to be detachably attachable. That is, in the metal-air battery 1, the casing 10 is constituted by the battery container 80, the inside cover 81, and the outside cover 82. FIG. 9 is an oblique view illustrating a state where only the inside cover 81 is attached to the battery container 80.

The inside cover 81 is provided with terminal connection ports 81A to 81C, a vent 81D, and the liquid inlet 12. The terminal connection ports 81A to 81C are openings through which terminals are connected to the respective current collectors of the air electrode 20, the charging electrode 70, and the metal negative electrode 30. A screw hole is formed in a bottom part of each of the terminal connection ports 81A to 81C. The vent 81D is a vent hole through which oxygen generated during charge of the metal-air battery 1 is released to the outside of the battery. The liquid inlet 12 is an opening through which the electrolytic solution is injected into the metal-air battery 1 (that is, into the battery container 80) that is assembled, and is configured to be closed by a liquid inlet cap 83 (not illustrated in FIG. 9) after liquid injection of the electrolytic solution.

The outside cover 82 is provided with terminal connection ports 82A to 82C and a vent 82D. The terminal connection ports 82A to 82C are openings through which terminals are connected to the respective current collectors of the air electrode 20, the charging electrode 70, and the metal negative electrode 30. Moreover, the terminal connection ports 82A to 82C communicate with the terminal connection ports 81A to 81C in the inside cover 81. The vent 82D is a vent hole through which oxygen generated during charge of the metal-air battery 1 is released to the outside of the battery and communicates with the vent 81D in the inside cover 81.

Two metal terminal plates 84 are arranged in each of the terminal connection ports 81A to 81C and each of the terminal connection ports 82A to 82C and the terminal connection ports 81A to 81C respectively communicate with the terminal connection ports 82A to 82C. A connection part that extends from each of the current collectors of the charging electrode 70 and the metal negative electrode 30 is arranged between two metal terminal plates 84. The metal terminal plates 84 are fixed to the inside cover 81 with a screw 85 so that each of terminals 86A to 86C is formed. During discharge, a load is connected between the terminal 86A and the terminal 86C (that is, between the air electrode 20 and the metal negative electrode 30). Moreover, during charge, a power source is connected between the terminal 86B and the terminal 86C (that is, between the charging electrode 70 and the metal negative electrode 30).

On a back surface side of the vent 82D of the outside cover 82, a gas-liquid separation film 87A is arranged. The gas-liquid separation film 87A does not hinder exhaust of oxygen through the vent 81D and the vent 82D that communicate with each other but prevents only leakage of the electrolytic solution. Moreover, in the metal-air battery 1, a gas-liquid separation film 87B is arranged also on an upper surface of the liquid inlet cap 83 by which the liquid inlet 12 is closed. This makes it possible to exhaust oxygen also through the liquid inlet 12.

Note that, the three-electrode metal-air secondary battery in which the air electrode 20 or the charging electrode 70 is properly used as the positive electrode depending on whether to be during discharge or during charge is taken as an example in FIG. 8. However, the disclosure is not limited thereto and a two-electrode metal-air secondary battery using the air electrode 20 as the positive electrode not only during discharge but also during charge may be adopted as long as a catalyst having oxygen reduction activity and oxygen evolution activity is used for the catalyst of the air electrode 20. That is, in the two-electrode metal-air secondary battery, the air electrode 20 functions also as the charging electrode during charge.

Figure 10:
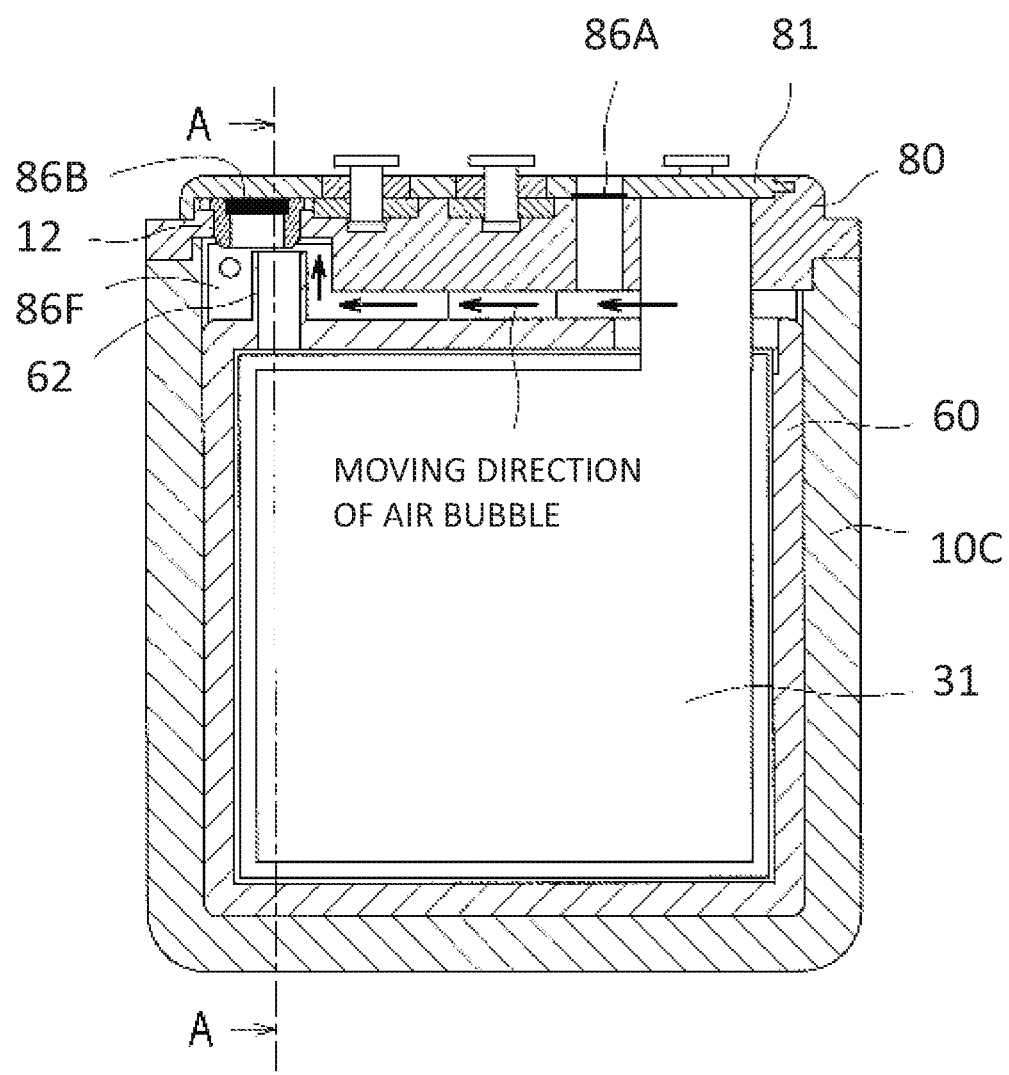
FIG. 10 is a sectional view including a main surface of a metal negative electrode in the metal-air battery of FIG. 7.
Figure 11:
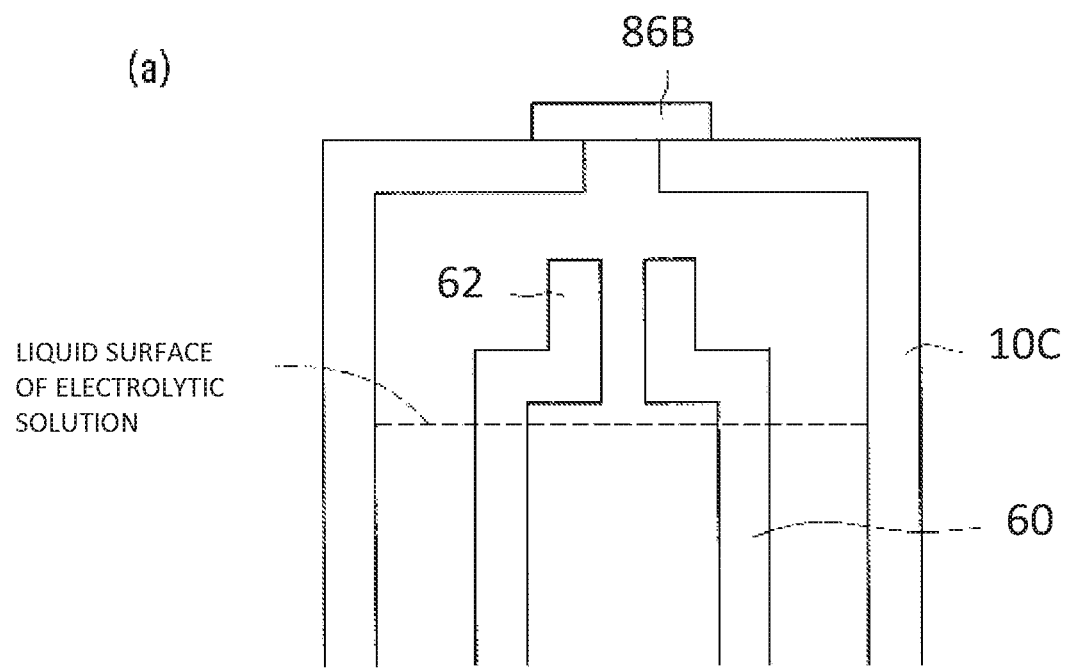
FIG. 11 is a schematic sectional view of the metal-air battery of FIG. 7, in which FIG. 11($a$) illustrates a standing state and FIG. 11($b$) illustrates a charge state.
Figure 11:
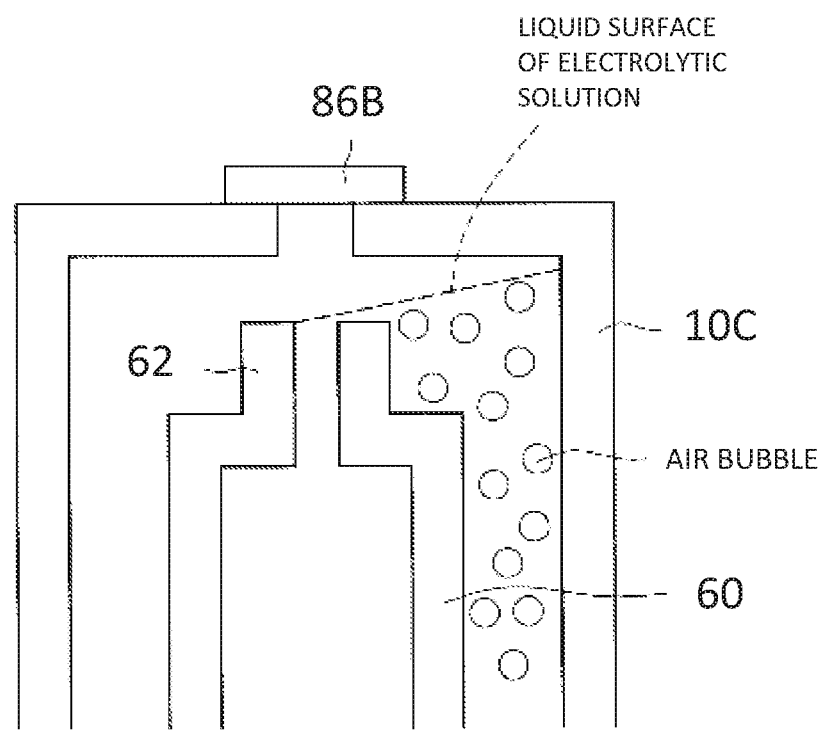

A basic configuration of the metal-air battery 1 according to Embodiment 4 is as described above, and a characteristic configuration of the metal-air battery 1 and an action effect thereof will be subsequently described with reference to FIGS. 10 and 11. FIG. 10 is a sectional view including a main surface (here, a surface where the current collector which is almost at a center of the metal negative electrode 30 is arranged) of the metal negative electrode 30 in the metal-air battery 1. FIG. 11 is a schematic sectional view of the metal-air battery 1 according to Embodiment 4 and corresponds to a sectional surface taken along a line A-A in FIG. 10. Note that, in FIG. 11, though the battery container 80 and the negative electrode housing 60 are illustrated, illustration of the electrodes (the metal negative electrode 30, the charging electrode 70, and the air electrode 20) is omitted. Moreover, the gas-liquid separation film 87B is illustrated as the gas-liquid separation film arranged on the upper surface of the battery container 80 in FIG. 11 because the gas-liquid separation film 87B has a structure more easily affected by rising of the liquid surface of the electrolytic solution than the gas-liquid separation film 87A so that wetting with the electrolytic solution is easily generated when the liquid surface of the electrolytic solution rises.

Figure 17:
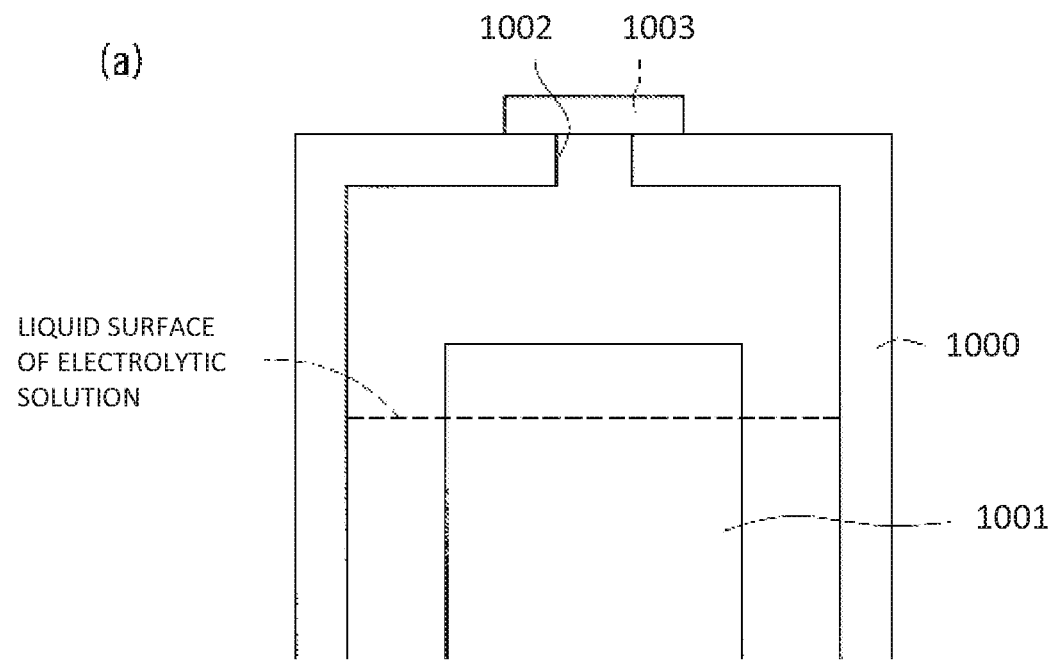
FIG. 17 is a schematic sectional view illustrating a part of a conventional metal-air battery, in which FIG. 17($a$) illustrates a liquid surface of an electrolytic solution of the metal-air battery in a standing state and FIG. 17($b$) illustrates the liquid surface of the electrolytic solution of the metal-air battery during charge.
Figure 17:
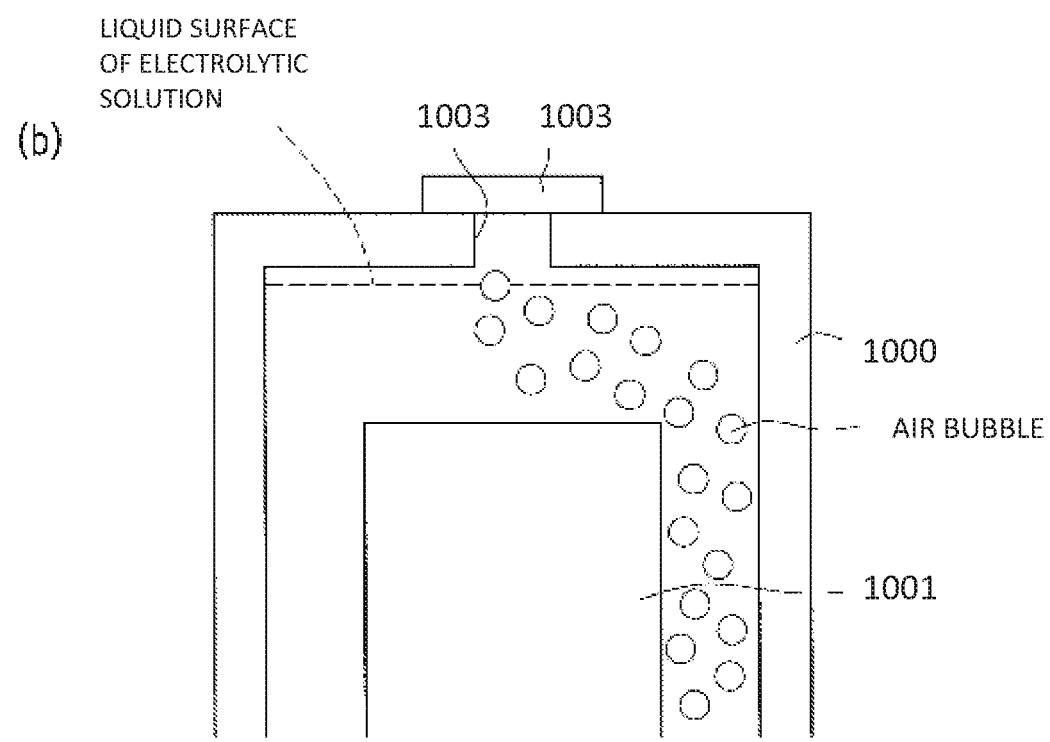

FIG. 17 is a schematic sectional view illustrating a part of a sectional surface of a conventional metal-air battery for explaining a conventional problem, in which FIG. 17(*a*) illustrates a liquid surface of an electrolytic solution of the metal-air battery in a standing state and FIG. 17(*b*) illustrates the liquid surface of the electrolytic solution of the metal-air battery during charge. Note that, in FIG. 17, a battery casing 1000, a meal negative electrode 1001, the electrolytic solution, a vent 1002, and a gas-liquid separation film 1003 covering the vent 1002 are illustrated and illustration of an air electrode and an auxiliary electrode is omitted to simplify a structure of the battery.

The vent 1002 is an opening through which oxygen generated near a charging electrode during charge of the metal-air battery is released to the outside of the battery casing. The gas-liquid separation film 1003 is provided to prevent leakage of the electrolytic solution from the battery casing 1000 and enable to output oxygen through the vent 1002.

As illustrated in FIG. 17(*b*), the oxygen generated near the charging electrode during charge becomes air bubbles in the electrolytic solution and the air bubbles move upward to the liquid surface. Thus, the liquid surface of the electrolytic solution rises. That is, as compared to the standing state illustrated in FIG. 17(*a*), the liquid surface of the electrolytic solution becomes higher during charge illustrated in FIG. 17(*b*). As a result, the liquid surface of the electrolytic solution becomes close to the gas-liquid separation film 1003, air bubbles accumulated in the liquid surface of the electrolytic solution break, and the gas-liquid separation film 1003 may be wet with the electrolytic solution.

The gas-liquid separation film 1003 that is wet does not function as the gas-liquid separation film so that oxygen in the battery casing 1000 is not able to be exhausted to an outside and an internal pressure in the battery increases. This causes leakage of the electrolytic solution from the battery casing 1000.

To cope with the problem described above, the metal-air battery 1 according to Embodiment 4 is characterized in that the liquid inlet 62 is provided on an upper part of the negative electrode housing 60. By providing the liquid inlet 62, the metal-air battery 1 is able to prevent leakage of the electrolytic solution during charge.

According to a structure of the metal-air battery 1 illustrated in FIG. 11, an upper end of the liquid inlet 62 is higher than the liquid surface of the electrolytic solution in the standing state illustrated in FIG. 11(*a*). During charge illustrated in FIG. 11(*b*), the liquid surface of the electrolytic solution rises due to air bubbles generated near the charging electrode 70, but when the liquid surface of the electrolytic solution finally reaches the upper end of the liquid inlet 62, the electrolytic solution is returned to the inside of the negative electrode housing 60 through the liquid inlet 62 due to gravity and further rising of the liquid surface of the electrolytic solution is avoided. Note that, the electrolytic solution in the negative electrode housing 60 permeates through the charging electrode 70 side via the separator 50.

That is, according to the structure of the metal-air battery 1, by providing the liquid inlet 62 having the cylindrical shape in the negative electrode housing 60, the liquid surface of the electrolytic solution is prevented from rising higher than the upper end of the liquid inlet 62 having the cylindrical shape during charge. Thus, it is possible to avoid the gas-liquid separation film 87B being wet due to the air bubbles accumulated near the liquid surface or the air bubbles near the gas-liquid separation film 87B breaking and the gas-liquid separation film 87B being wet with the electrolytic solution that is scattered. Further, by avoiding wetting of the gas-liquid separation film 87B with the electrolytic solution, the gas-liquid separation film 87B does not fail to function and an increase in an internal pressure in the casing 10 is able to be prevented. As a result, the electrolytic solution is able to be prevented from leaking from a joint (for example, joint between the external casing plate 80A or 80B and the inside cover 81) or the like in the battery container 80 of the metal-air battery 1.

Moreover, in the metal-air battery 1, the liquid inlet 62 in the negative electrode housing 60 is preferably positioned below the gas-liquid separation film 87B (that is, below the liquid inlet 12). This is because the liquid surface of the electrolytic solution during charge is lowest when being near the liquid inlet 62, and when the liquid inlet 62 is positioned below the gas-liquid separation film 87B, it is possible to most effectively prevent the gas-liquid separation film 87B from being wet with the electrolytic solution. Note that, for the liquid inlet 62 to be positioned below the liquid inlet 12, center lines of both of them in a vertical direction do not need to be always matched and may be slightly shifted as illustrated in FIG. 10.

Moreover, a configuration in which, on a lower surface of the inside cover 81 (that is, an upper inner surface of the casing), a recess 81F (refer to FIG. 10) is formed near a part facing the liquid inlet 62 and the liquid inlet 62 is arranged so as to be inserted into the recess 81F is preferable. In the configuration, the electrolytic solution whose liquid surface rises collides with the inside cover 81 before flowing into the liquid inlet 62, so that air bubbles in the liquid surface are broken due to the collision and exhaust of oxygen is facilitated.

Further, since the liquid surface of the electrolytic solution is prevented from rising higher than the upper end surface of the liquid inlet 62 having the cylindrical shape, it is also possible to prevent liquid junction between electrodes caused by a liquid path that is formed by the electrolytic solution attached to the inside cover 80 when the liquid surface of the electrolytic solution rises, and an effect of preventing a short circuit is also exerted.

Moreover, in the metal-air battery 1 according to Embodiment 4, by providing the liquid inlet 62 that is projected and has the cylindrical shape, an upper space inside the negative electrode housing 60 is able to be reduced. During discharge, concentration of metal ions (for example, concentration of zinc ions) inside the negative electrode housing 60 increases, so that an amount of the electrolytic solution inside the negative electrode housing 60 may increase due to an osmotic pressure of the separator 50 that is on an active surface of the negative electrode. As a result, the liquid surface of the electrolytic solution existing outside the negative electrode housing 60 is lowered and an acting area of the air electrode is reduced, so that a discharge characteristic may be lowered. When the upper space inside the negative electrode housing 60 is reduced, an amount of the electrolytic solution required to exhaust the electrolytic solution 40 inside the negative electrode housing 60 from the inside of the negative electrode housing 60 to the outside of the negative electrode housing 60 via the liquid inlet 62 when the liquid surface of the electrolytic solution 40 inside the negative electrode housing 60 rises during discharge is small, so that lowering of the liquid surface outside the negative electrode housing 60 is able to be suppressed and lowering of the discharge characteristic is able to be suppressed without reducing the acting area of the air electrode.

Moreover, in the metal-air battery 1 according to Embodiment 4, when hydrogen gas is generated by a self-corrosion reaction of the metal negative electrode 30 in the negative electrode housing 60, the hydrogen gas is able to be exhausted through the liquid inlet 62 to the outside of the negative electrode housing 60. This makes it possible to suppress expansion inside the negative electrode housing 60.

Figure 12:
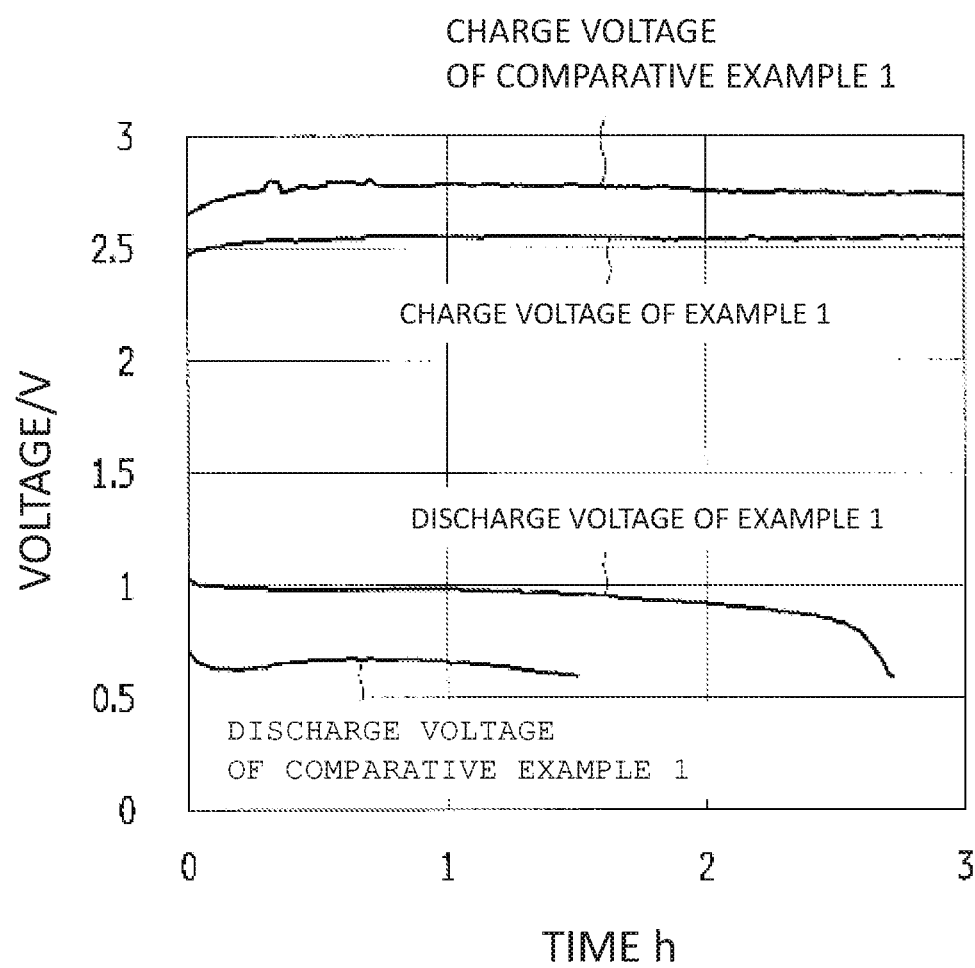
FIG. 12 is a graph illustrating results obtained by conducting charge and discharge experiments in Example 1 and Comparative example 1.

In the metal-air battery 1 (Example 1) according to Embodiment 1 and Comparative example 1, charge and discharge experiments are conducted and results indicated by a graph of FIG. 12 are obtained. Note that, conditions of the experiments in Comparative example 1 are all the same as those of the metal-air battery 1 (Example 1) other than that no liquid inlet is provided in the negative electrode housing 60.

First, during charge, a power source (5 V and 5 A) is connected between the metal negative electrode 30 and the charging electrode 70 and charge is performed for three hours. As a charge voltage at this time, Example 1 enables to perform the charge with a lower voltage than in Comparative example 1 (the charge voltage after the charge for three hours is 2.75 V in Comparative example 1 and 2.55 V in Example 1). Moreover, when leakage of the electrolytic solution is checked by visual observation, leakage of the electrolytic solution (wetting of a surface of a terminal of the inside cover 81 with liquid) is confirmed in Comparative example 1 but no leakage of the electrolytic solution is confirmed in Example 1.

Next, during discharge, a load (5 V and 5 A) is connected between the metal negative electrode 30 and the air electrode 20 and discharge is performed while setting the load in a variable manner so that a reference current for electrode evaluation is always fixed at 30 mA/cm$^2$. In addition, a time when a discharge voltage is 0.6 V or less is determined as a lifetime. It is confirmed that, as the discharge voltage at this time, Example 1 enables to perform the discharge with a higher voltage as a whole than in Comparative example 1 and also that the lifetime in Example 1 is longer (a discharge time until the lifetime of discharge is reached is 1.5 hours in Comparative example 1 and 2.7 hours in Example 1).

In the aforementioned experiment results, it is considered that a difference of performance is generated between the batteries depending on whether or not the electrolytic solution leaks. That is, while the charge voltage is high and the discharge voltage is low due to leakage of the electrolytic solution in Comparative example 1, Example 1 enables to reduce the charge voltage and increase the discharge voltage as compared to Comparative example 1 because there is no leakage of the electrolytic solution.

Embodiment 5

In the metal-air battery 1 according to Embodiment 4, as illustrated in FIG. 10, the liquid inlet 62 and the liquid inlet 12 are provided on one longitudinal end side (left-end side in FIG. 10) of the metal-air battery 1. Thus, air bubbles generated during charge are guided (a movement direction is illustrated by an arrow of a solid line in FIG. 10) to a vicinity of the liquid inlet 62 and the liquid inlet 12 along the lower surface of the inside cover 81 together with the electrolytic solution whose liquid surface rises and are returned into the negative electrode housing 60 through the liquid inlet 62.

Figure 13:
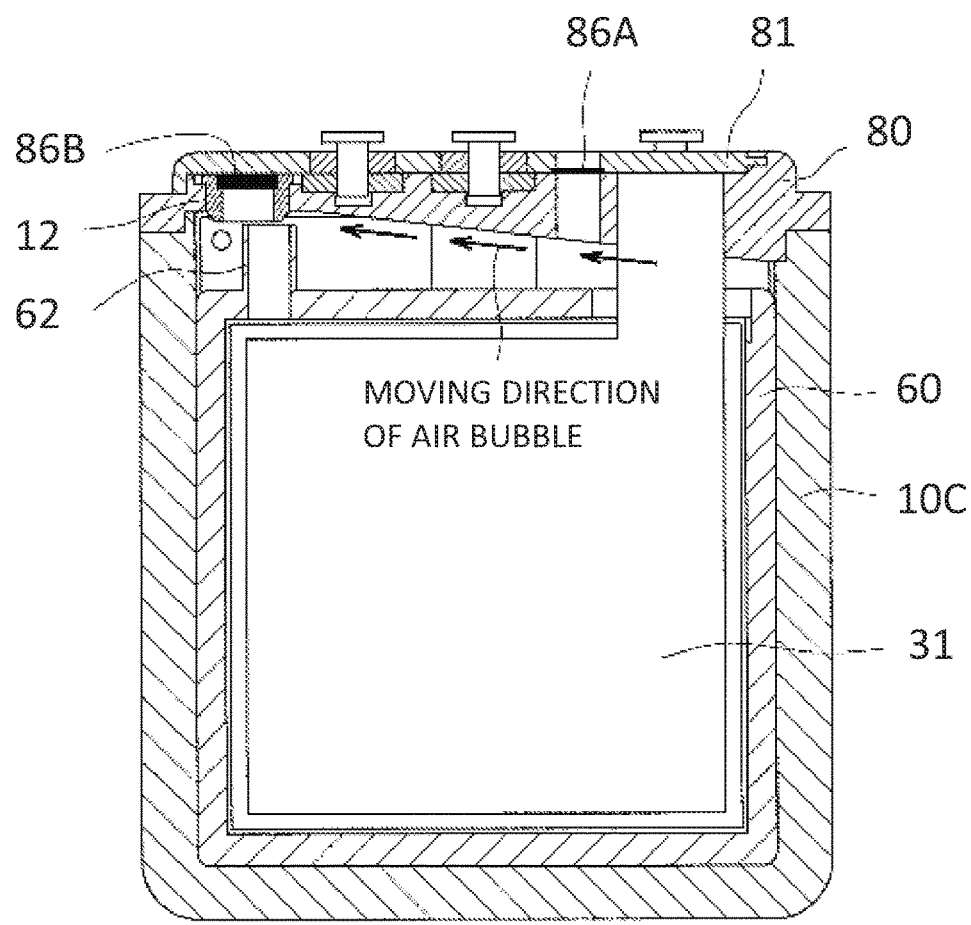
FIG. 13 is a sectional view including a main surface of a metal negative electrode in a metal-air battery according to Embodiment 5.

FIG. 13 illustrates a configuration of a metal-air battery 1 according to Embodiment 5 and is a sectional view including a main surface of the metal negative electrode 30 in the metal-air battery 1. In the metal-air battery 1 illustrated in FIG. 13, the liquid inlet 62 and the liquid inlet 12 are provided on one longitudinal end side (left-end side in FIG. 13) of the metal-air battery 1. Further, in the metal-air battery 1 illustrated in FIG. 13, the lower surface of the inside cover 81 is an inclined surface that is inclined in a longitudinal direction. The inclined surface is set as an inclined surface that rises from an end on a side where the liquid inlet 62 and the liquid inlet 12 are not arranged toward an end on the side where the liquid inlet 62 and the liquid inlet 12 are arranged.

Also in the metal-air battery 1 according to Embodiment 5, air bubbles generated during charge are guided (a movement direction is illustrated by an arrow of a solid line in FIG. 13) to a vicinity of the liquid inlet 62 and the liquid inlet 12 along the lower surface of the inside cover 81 together with the electrolytic solution whose liquid surface rises. At this time, since the lower surface of the inside cover 81 is the inclined surface in the longitudinal direction, the air bubbles near the liquid surface are guided so that the number of air bubbles is reduced while smoothly growing. Accordingly, the number of air bubbles is sufficiently reduced near the liquid inlet 12 and it is possible to prevent a lot of air bubbles from bursting near the gas-liquid separation film 87B.

Embodiment 6

Figure 14:
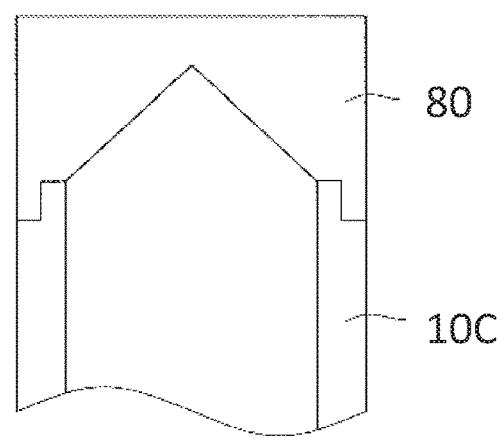
FIG. 14 illustrates a configuration of a metal-air battery according to Embodiment 6 and is a sectional view illustrating a shape of a lower surface of an inside cover in a transverse direction.
Figure 15:
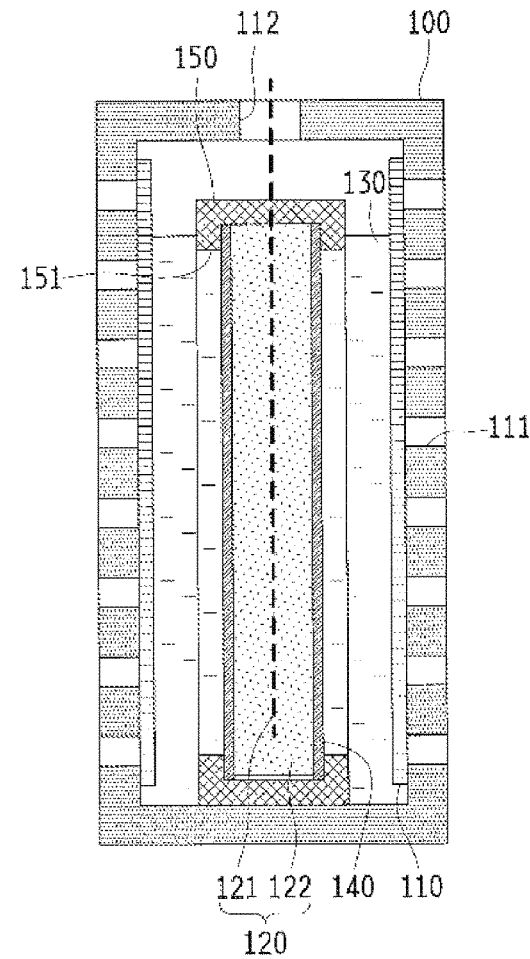
FIG. 15 is a sectional view illustrating a schematic configuration of a conventional metal-air battery.
Figure 16:
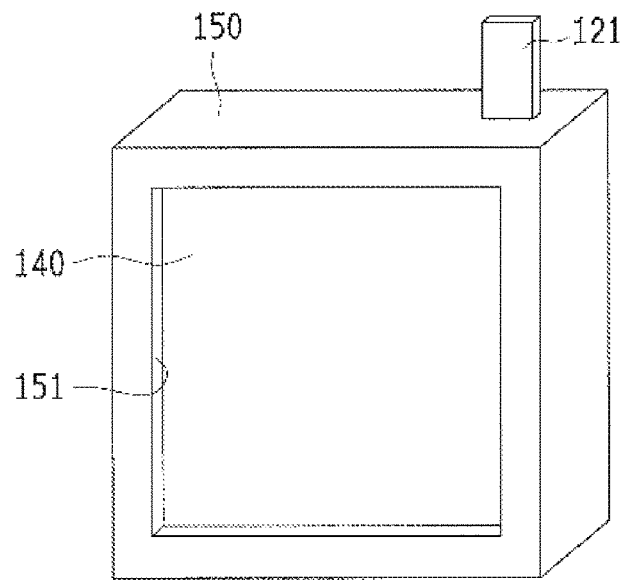
FIG. 16 is an oblique view illustrating a state where a metal negative electrode used in the conventional metal-air battery is covered by a coating material and a separator.

FIG. 14 illustrates a configuration of a metal-air battery 1 according to Embodiment 6 and is a sectional view illustrating a shape of the lower surface of the inside cover 81 in a transverse direction. As illustrated in FIG. 14, in the metal-air battery 1 according to Embodiment 6, the lower surface of the inside cover 81 is formed to be an inclined surface having an inverse V-shape in the transverse direction.

Also in the metal-air battery 1 according to Embodiment 6, the electrolytic solution whose liquid surface rises is guided to a vicinity of the liquid inlet 62 and the liquid inlet 12 along the lower surface of the inside cover 81. At this time, since the lower surface of the inside cover 81 is the inclined surface having the inverse V-shape in the transverse direction, air bubbles near the liquid surface are concentrated near a center in the transverse direction and guided so that the number of air bubbles is reduced while smoothly growing. Accordingly, the number of air bubbles is sufficiently reduced near the liquid inlet 12 and it is possible to prevent a lot of air bubbles from bursting near the gas-liquid separation film 87B.

Embodiment 7

A metal-air battery 1 according to Embodiment 7 is characterized in that frictional resistance of the lower surface of the inside cover 81 is reduced. As a specific method, it is considered that a surface of the lower surface of the inside cover 81 is polished or the inside cover 81 is subjected to injection molding so that the lower surface of the inside cover 81 is a smooth surface (for example, with surface roughness Ra of 0.2 µm or less). Alternatively, the lower surface of the inside cover 81 may be subjected to surface treatment so that the frictional resistance of the lower surface of the inside cover 81 is reduced. An example of the surface treatment in this embodiment includes water-repellent processing such as Teflon (registered trademark) processing.

Also in the metal-air battery 1 according to Embodiment 7, the electrolytic solution whose liquid surface rises is guided to a vicinity of the liquid inlet 62 and the liquid inlet 12 along the lower surface of the inside cover 81. At this time, since the frictional resistance of the lower surface of the inside cover 81 is reduced, air bubbles near the liquid surface are guided so that the number of air bubbles is reduced while smoothly growing. Accordingly, the number of air bubbles is sufficiently reduced near the liquid inlet 12 and it is possible to prevent a lot of air bubbles from bursting near the gas-liquid separation film 87B.

Though Embodiments 4 to 7 described above are different in the shape of the lower surface of the inside cover 81 and in that whether or not the surface treatment is performed, mobility of air bubbles near the liquid surface of the electrolytic solution is compared on the basis of the difference. Moreover, as a comparative example, mobility of air bubbles when no liquid inlet 62 is provided in the negative electrode housing 60 is also checked.

First, in the comparative example in which no liquid inlet 62 is provided, air bubbles that are generated stay on the liquid surface of the electrolytic solution without moving and do not reach the liquid inlet 62. On the other hand, in the configuration of Embodiment 4 (in which the lower surface of the inside cover 81 is a horizontal surface and no surface treatment is performed (with surface roughness Ra of 3.2 μm or more)), it is confirmed that the generated air bubbles move to the liquid inlet 62 having the cylindrical shape together with the electrolytic solution. At this time, a time from when the air bubbles are generated until reaching the liquid inlet 62 is 10 sec or more.

Moreover, in all the configuration of Embodiment 5 (in which the lower surface of the inside cover 81 is the inclined surface in the longitudinal direction), the configuration of Embodiment 6 (in which the lower surface of the inside cover 81 is the inclined surface having the inverse V-shape in the transverse direction), and the configuration of Embodiment 7 (in which the lower surface of the inside cover 81 is subjected to the surface treatment), it is confirmed that the generated air bubbles move to the liquid inlet 62 together with the electrolytic solution. It is also confirmed that a time from when the air bubbles are generated until reaching the liquid inlet 62 is less than 10 sec and movement of the air bubbles is facilitated as compared to the configuration of Embodiment 4. Further, it is confirmed that as the time from when the air bubbles are generated until reaching the liquid inlet 62 is shorter, the number of air bubbles in the liquid surface is reduced.

The disclosure is not limited to each of the embodiments described above and may be modified in various manners within the scope indicated in the claims, and an embodiment achieved by appropriately combining technical means disclosed in each of different embodiments is also encompassed in the technical scope of the disclosure.

DESCRIPTION OF THE INCORPORATED

The present international application claims the priority based on Japanese Patent Application No. 2017-192569 and Japanese Patent Application No. 2017-192571, filed in Japan Patent Office on Oct. 2, 2017, and the entire contents of Japanese Patent Application No. 2017-192569 and Japanese Patent Application No. 2017-192571 are incorporated in the present international application by reference.

The invention claimed is:

1. A metal-air battery comprising:
a casing,
a metal negative electrode that contains metal serving as a negative electrode active material; and
an air electrode that has oxygen reduction activity, the metal negative electrode and the air electrode being arranged so as to face each other in a state where at least a part of the metal negative electrode and the air electrode is immersed in an electrolytic solution inside the casing, wherein
a negative electrode housing is included inside the casing, the metal negative electrode is housed in the negative electrode housing,
a first separator separating the metal negative electrode and the air electrode is arranged at a side surface of the negative electrode housing, and
a first liquid inlet through which inside of the negative electrode housing and a space between the casing and the negative electrode housing communicate with each other is provided on an upper surface of the negative electrode housing.

2. The metal-air battery according to claim 1, wherein in the inside of the negative electrode housing, a space is provided between an upper end of the metal negative electrode and the upper surface of the negative electrode housing.

3. The metal-air battery according to claim 2, wherein a height H, a lower region volume V1, and an upper region volume V2 satisfy $0.08<(H/(V1/V2))<2.0$,
where H (mm) is a height of the space between the upper end of the metal negative electrode and the upper surface of the negative electrode housing, V1 ($cm^3$) is a lower region volume of a part inside the negative electrode housing and lower than a liquid surface of the electrolytic solution when the metal-air battery stands, and V2 ($cm^3$) is an upper region volume of a part inside the negative electrode housing and higher than the liquid surface of the electrolytic solution when the metal-air battery stands.

4. The metal-air battery according to claim 1, wherein the first liquid inlet includes a liquid inlet cover.

5. The metal-air battery according to claim 4, wherein the liquid inlet cover is of a sealing type.

6. The metal-air battery according to claim 4, wherein the liquid inlet cover is a first gas-liquid separation film.

7. The metal-air battery according to claim 4, wherein the liquid inlet cover has a valve structure through which liquid or gas flows only from the inside to the outside of the negative electrode housing.

8. The metal-air battery according to claim 1, wherein the air electrode has oxygen reduction activity and oxygen evolution activity,
a second liquid inlet and a second gas-liquid separation film that covers the second liquid inlet are arranged on an upper surface of the casing, and
an upper end of the first liquid inlet is provided at a position higher than a liquid surface of the electrolytic solution.

9. The metal-air battery according to claim 1, further comprising:
a positive electrode that is arranged so as to face the metal negative electrode in a state of being partially immersed in the electrolytic solution and that has oxygen evolution activity, wherein
a second separator separating the metal negative electrode and the positive electrode is arranged at a side surface of the negative electrode housing,
a second liquid inlet and a gas-liquid separation film that covers the second liquid inlet are arranged on an upper surface of the casing, and
an upper end of the first liquid inlet is provided at a position higher than a liquid surface of the electrolytic solution.

10. The metal-air battery according to claim 8, wherein a protrusion having a cylindrical shape is provided on the upper surface of the negative electrode housing and the first liquid inlet is provided in the protrusion having a cylindrical shape.

11. The metal-air battery according to claim 10, wherein a configuration in which, on an upper inner surface of the casing, a recess is formed in a part facing the first liquid inlet and the first liquid inlet of the protrusion having a cylindrical shape is arranged so as to be inserted into the recess is provided.

12. The metal-air battery according to claim 8, wherein an upper inner surface of the casing is an inclined surface inclined in a longitudinal direction, and
the first liquid inlet is provided near a rising-side end of the inclined surface.

13. The metal-air battery according to claim 8, wherein an upper inner surface of the casing is an inclined surface having an inverse V-shape in a transverse direction.

14. The metal-air battery according to claim 8, wherein an upper inner surface of the casing is subjected to surface treatment by which frictional resistance is reduced.

15. A method for producing a metal-air battery that includes
a casing,
an air electrode that has oxygen reduction activity, and
a metal negative electrode arranged so as to face the air electrode with a separator therebetween and housed in a negative electrode housing provided with a liquid inlet, wherein
the negative electrode housing is included and housed inside the casing,
the metal negative electrode is included and housed inside the negative electrode housing,
the liquid inlet is provided so that inside of the negative electrode housing and a space between the casing and the negative electrode housing communicate with each other, and
when an electrolytic solution is injected into the casing, the electrolytic solution is injected such that the metal negative electrode and the air electrode are immersed in the electrolytic solution and such that a liquid surface of the electrolytic solution is lower than the liquid inlet of the negative electrode housing.

16. The metal-air battery according to claim 1, wherein a second liquid inlet through which the space between the casing and the negative electrode housing and outside of the casing communicate with each other is provided on an upper surface of the casing, and
the second liquid inlet is provided at a same side as a side at which the first liquid inlet is provided.

17. A metal-air battery comprising:
a metal negative electrode that contains metal serving as a negative electrode active material; and
an air electrode that has oxygen reduction activity, the metal negative electrode and the air electrode being arranged so as to face each other in a state where at least a part of the metal negative electrode and the air electrode is immersed in an electrolytic solution inside a casing, wherein
the metal negative electrode is housed in a negative electrode housing in the casing,
a first separator separating the metal negative electrode and the air electrode is arranged at a side surface of the negative electrode housing,
a first liquid inlet through which inside of the negative electrode housing and outside of the negative electrode housing communicate with each other is provided on an upper surface of the negative electrode housing,
in the inside of the negative electrode housing, a space is provided between an upper end of the metal negative electrode and the upper surface of the negative electrode housing, and
a height H, a lower region volume V1, and an upper region volume V2 satisfy $0.08<(H/(V1/V2))<2.0$, where H (mm) is a height of the space between the upper end of the metal negative electrode and the upper surface of the negative electrode housing, V1 ($cm^3$) is a lower region volume of a part inside the negative electrode housing and lower than a liquid surface of the electrolytic solution when the metal-air battery stands, and V2 ($cm^3$) is an upper region volume of a part inside the negative electrode housing and higher than the liquid surface of the electrolytic solution when the metal-air battery stands.

* * * * *